United States Patent
Billiet et al.

(10) Patent No.: US 7,144,548 B2
(45) Date of Patent: Dec. 5, 2006

(54) METHOD FOR BINDER EXTRACTION AND SINTERING OF GREEN BODIES IN A STATE OF WEIGHTLESSNESS

(76) Inventors: Romain Louis Billiet, 135A Malacca Street, Penang (MY) 10400; Hanh Thi Nguyen, 135A Malacca Street, Penang (MY) 10400

( * ) Notice: Subject to any disclaimer, the term of this patent is extended or adjusted under 35 U.S.C. 154(b) by 184 days.

(21) Appl. No.: 10/720,613

(22) Filed: Nov. 17, 2003

(65) Prior Publication Data

US 2005/0106058 A1    May 19, 2005

(51) Int. Cl.
*B22F 3/14* (2006.01)
(52) U.S. Cl. .......................................................... 419/49
(58) Field of Classification Search .................. 419/49
See application file for complete search history.

(56) References Cited

U.S. PATENT DOCUMENTS

| | | | |
|---|---|---|---|
| 4,737,332 A | | 4/1988 | Miyashita et al. |
| 4,778,650 A | * | 10/1988 | Hermansson et al. ........ 264/604 |
| 4,825,599 A | | 5/1989 | Swann, Jr. |
| 4,883,639 A | * | 11/1989 | Adlerborn et al. ............. 419/49 |
| 4,931,238 A | * | 6/1990 | Nishio et al. ................. 264/642 |
| 4,971,740 A | * | 11/1990 | Nishio et al. ................. 264/643 |
| 5,516,481 A | | 5/1996 | Ishizaki et al. |
| 5,900,207 A | * | 5/1999 | Danforth et al. ............. 264/603 |
| 6,565,764 B1 | | 5/2003 | Hiraoka et al. |

FOREIGN PATENT DOCUMENTS

| JP | 0294806 A1 | * | 12/1988 |
|---|---|---|---|
| JP | 61177301 A | * | 8/1996 |

* cited by examiner

*Primary Examiner*—Daniel Jenkins

(57) ABSTRACT

Gravitational sag and shape distortion by friction over supporting hardware during binder removal and sintering of green bodies made from sinterable particulate materials are overcome by processing in a supercritical fluid medium at a pressure whereby the density of the medium approaches or equals that of the green bodies.

14 Claims, No Drawings

METHOD FOR BINDER EXTRACTION AND SINTERING OF GREEN BODIES IN A STATE OF WEIGHTLESSNESS

CROSS-REFERENCE TO RELATED APPLICATIONS

Not Applicable

REFERENCES CITED

U.S. Patent Documents

| | | | |
|---|---|---|---|
| 4,737,332 | April 1988 | Miyashita et al. | 264/233 |
| 4,825,599 | May 1989 | Swann, Jr. | 52/2 |
| 5,516,481 | May 1996 | Ishizaki et al. | 264/443 |
| 6,565,764 | May 2003 | Hiraoka et al. | 216/56 |

Other Publications

*CRC Handbook of Chemistry and Physics*, 84$^{th}$ Edition, 2003, CRC Press LLC, Boca Raton, Fla.

*Gase-Handbuch*, 3. *Auflage*, 1989, Messer Griesheim GmbH, Frankfurt, Germany

German, R. M. & Bose, A., *Injection Molding of Metals and Ceramics*, 1997, Metal Powder Industries Federation, Princeton, N.J.

Mutsuddy, B. C. & Ford, R. G., "*Ceramic Injection Molding*", 1995, Chapman & Hall, London, UK Anonymous, "*Supercritical Extraction of Binders for Metal Injection Moulded Components*", Goceram AB website—http://www.goceram.com/abstract01.htm Conway, J. J, & Rizzo, F. J., "*Hot Isostatic Pressing of Metal Powders*", Metals Handbook, Vol. 7, 1998

Boschi-Filho, H. & Buthers, C. C., "*Second Virial Coefficient For Real Gases At High Temperature*", Jan. 24, 1997, arXiv, Cornell University (http://arxiv.org/PS cache/cond-mat/pdf/9701/0701185. pdf)

STATEMENT REGARDING FEDERALLY SPONSORED RESEARCH OR DEVELOPMENT

Not Applicable.

REFERENCE TO A MICROFICHE APPENDIX

Not Applicable.

BACKGROUND—FIELD OF INVENTION

The present invention generally relates to a method for controlling shape distortion due to gravitational sag and frictional forces during binder extraction and sintering of green bodies in a supercritical fluid medium.

BACKGROUND—DESCRIPTION OF PRIOR ART

Shape distortion due to gravitational sag and frictional forces is a well known problem in the art of processing green bodies made from sinterable particulate materials.

The problem stems from the fact that organic binders are necessarily admixed to the particulate materials from which green bodies are formed for reasons such as shielding the particulates from atmospheric oxygen, providing lubricity in the pressing die or acceptable melt rheology for injection molding. The organic binder also acts as an adhesive holding the particulates together, thus providing tensile strength to the green body upon ejection from the pressing die or the cavity of the injection mold so that it can be handled or machined in the green condition.

The amount of organic binder used varies from one industrial application or process to another. In powder pressing for example, as applied in the well-known powder metallurgy (P/M) industry, the amount of organic lubricant—usually a synthetic wax such as Acrawax™—does not generally exceed 1% by weight. In the tungsten carbide industry on the other hand, the amount of lubricant added, generally a paraffin wax, is much higher, about 2–3% by weight which, due to the high density of tungsten, can equate to around 30% by volume. In metal and ceramic injection molding technology the amount of binder is even higher, generally in the 40–50% by volume range and in some instances over 60%.

Habitually, the ultimate objective in processing green bodies made from particulate materials is to produce end products that will be as dense as possible. Densification is achieved through the well-known process of sintering.

Sintering may be summarily defined as the formation of interparticulate bonds with attendant decrease in surface energy. Atom mobility is a prerequisite to the initiation of interparticulate bond formation. This may, in some cases, occur at temperatures as low as a few hundred degrees but usually requires temperatures well above those at which the organic binder will have completely degraded. Clearly, at that moment, whatever contribution the organic binder was making to the green body's tensile strength will have evanesced.

Interparticulate bond formation starts at the points of physical contact between contiguous particulates by the development of what is commonly termed a neck, mainly by mass transport mechanisms such as evaporation-condensation and surface diffusion. Thus, during the initial stage of sintering, the center to center distance between original contiguous particulates remains substantially unchanged. As interparticulate necks grow, the tensile strength of the green body gradually builds up again.

Between the time of elimination of the organic binder and formation of interparticulate bonds, the green body's tensile strength goes through a minimum often insufficient to counter the pull of gravity. Consequently the green body being processed may droop or sag.

The magnitude of gravitational sag depends on a number of factors. Factors related to the particulates are their particle size, shape, surface morphology and density. Large dense particulates are subjected to a greater force than smaller lightweight ones following Newton's second law of motion. Smooth spherical particulates will sag more than spiky ones, the latter tending to mechanically interlock. Factors related to the green body are its geometry and density. A green body in the shape of a pyramid will be more resistant to sagging than a part with a long cantilever feature. A green body having a high packing density, the latter being the volumetric fraction of particulate matter, will deform less than one having a low packing density, i.e. containing more organic binder. Factors related to the processing environment include the sintering atmosphere, the rate of temperature rise, mechanical vibration transmitted from circulating fans, vacuum pumps, etc.

Gravitational sag is a major problem during binder removal and sintering of green bodies made from particulate materials, particularly in MIM technology. To date the prior art has yet to come up with a satisfactory solution to this problem. Often the only practical way to rectify the shape of sintered parts distorted by gravitational sag is via post-sintering coining operations.

The second stage in sintering, for the purpose of describing this invention, takes place when interparticulate neck growth has proceeded to the point where the center to center distance between the original particulates begins to diminish. This is the outset of the well-known phenomenon of shrinkage upon sintering. Because of interparticulate bond formation, the individuality of the original particulates is lost in favor of a three-dimensional interconnected or so-called open porosity structure. As the bonds grow and merge, grain boundaries are formed at the areas of contact and the entire structure undergoes volumetric shrinkage. The point at which the sintering process is deemed complete is often a purely economic consideration. It is usually neither easy nor necessary to achieve full densification in the end product as a small amount of residual porosity generally does not adversely affect material properties. For example, complete densification is readily accomplished in liquid phase sintered cemented carbide compositions containing 3–25 weight percent cobalt (about 5–40 volume percent) whereas it is difficult to achieve full density with cobalt contents of less than 3 weight percent. In addition, for cobalt contents in excess of 25 weight percent, part shape is difficult to maintain due to the high liquid-phase fraction, which allows the part to sag.

The magnitude of the shrinkage upon sintering of green bodies is dependent on the volume fraction of particulate material present in the green body. A rule of thumb for determining the linear shrinkage S is:

$$S = 1 - \Phi^{1/3} \quad (1)$$

where S=(green dimension−sintered dimension)/green dimension $\Phi$=volume of particulates/volume of the green body Thus, if a green body is composed of 50% by volume of particulates and 50% binder, the linear shrinkage, S, will be about 20.6%. In commercial applications, the linear shrinkage may be as high as 26%, which corresponds to a volumetric shrinkage of about 40%.

Green bodies must be supported during sintering and, from the foregoing, it is evident that the green body, during its inevitable motion over the surface of its support as a result of shrinkage, will be subjected to tribological forces, which depend on a number of factors such as the pressure the green body exerts on its support, which is a direct result of gravity, and the resistance exerted by the support in response to the motion of the green body, i.e. the friction or drag.

In the most benign situations, for example when a lightweight, substantially flat green body moves over a smooth support, frictional forces may be insufficient to distort the geometry of the green body, but in most situations, and particularly if the green body is of high density and only has a small area of contact with its support, the distortion may be substantial, often sufficient to tear the green body apart.

Thus maintaining shape integrity during shrinkage constitutes a challenging problem in the processing of green bodies made from particulate materials. The prior art has devised various makeshift solutions to obviate the problem of shape distortion during shrinkage. A common one consists of incorporating a sacrificial supporting surface as an integral part to the geometry of the green body. This support is then machined or ground off after sintering. Moreover, the prior art has not found any practical solution to the problem of shape distortion of a green body due to friction on its supporting hardware as a result of the inevitable shrinkage taking place upon sintering.

As can be inferred from the foregoing, gravitational sag and distortion by frictional forces during shrinkage, both a direct consequence of gravity, are two major problems in the art of fabricating parts from particulate materials and, in particular, they constitute a major impediment to the fabrication of large sized parts or parts with convoluted geometries such as for example, spheroidal parts, springs, helical coils, Archimedes screws or Moebius rings.

Conceivably, the effects of gravity could be mitigated by processing in a low gravity environment such as near-Earth space, as advocated by Swann Jr., U.S. Pat. No. 4,825,599. An alternative technique is disclosed by Ishizaki et al., U.S. Pat. No. 5,516,481, who teach a containerless processing technique aimed at producing spheres from materials kept buoyant in a pressure medium the density of which is held at that of the materials being processed.

BRIEF SUMMARY OF THE INVENTION

In accordance with the present invention, a method is provided to fabricate sintered articles from particulate materials without undergoing shape distortion due to gravitational sag or frictional forces during shrinkage. The invention consists of processing the green bodies in a dynamic pressurized supercritical fluid medium that is a solvent for the organic binder contained in the green body during the binder extraction part of the process and the density of which is constantly adjusted so as to substantially match that of the green bodies being processed such that said bodies remain substantially in a state of buoyancy or weightlessness throughout the binder removal and sintering process and the problems caused by gravity, i.e. gravitational sag and shape distortion by friction, are thus circumvented.

OBJECTS AND ADVANTAGES

It is a primary object of this invention to provide a means to circumvent gravitational sag during binder removal and sintering of green bodies.

It is another object of this invention to provide a means to circumvent shape distortion as a result of friction over supporting hardware during binder removal and sintering of green bodies.

Yet another object of the present invention is to provide a method to fabricate parts having convoluted geometries from sinterable materials.

Still another object of the present invention is to provide a method to fabricate large parts from sinterable particulate materials.

A still further object of this invention is to provide a method for containerless hot isostatic pressing (HIP).

BRIEF DESCRIPTION OF THE SEVERAL VIEWS OF THE DRAWINGS

Not applicable.

DETAILED DESCRIPTION OF THE INVENTION

The first step in the application of this invention is to form a green body from a homogeneous mixture comprising at least one finely divided sinterable particulate material and an organic binder. The organic binder will generally be made up of several different organic constituents which may include but are not limited to mineral or vegetable oils and greases, stearic acid and various waxes such as paraffin wax, microcrystalline wax, beeswax, carnauba wax, candelilla wax, etc. What is important in the application of this invention is that the organic binder be soluble in supercritical fluids such as carbon dioxide, ammonia, methane, propane, ethanol, Freon™ or the like.

Supercritical fluid extraction is a well-known prior art technique applied in such diverse fields of industry as petroleum and other fossil fuel separation, propane deasphalting, activated carbon regeneration, separation of organic-aqueous solutions, polymer and monomer processing, extraction of edible oils, coffee decaffeination, isolation of lipophilic compounds, extraction of aroma compounds for food and cosmetic applications, removal of pesticide residues, treatment of waste streams, extraction of chemotherapeutic agents, extraction of veterinary drug residues from meat, etc.

More recently supercritical fluid extraction has been found to be an effective and sensible technique for the removal of organic binders from green parts. For example, Miyashita et al., U.S. Pat. No. 4,737,332 teach extraction of a dispersion medium in supercritical carbon dioxide without heating to high temperature while Hiraoka et al., U.S. Pat. No. 6,565,764 teach extraction of a polymeric binder wherein the polymer is first broken down by ozone gas, an electron beam or ion exchange, and the resulting decomposed polymer is then removed by supercritical carbon dioxide.

However, like other prior art binder removal techniques, supercritical fluid extraction fails to address the problem of gravitational sag upon reduction of the green body's tensile strength as a result of binder elimination.

As, during binder removal and sintering, the body being processed evolves from the green state to the sintered state, its density likewise evolves from the green density to the sintered density. For example, a typical green body composition of 86% by weight of alumina powder and 16% microcrystalline wax may have a green density of about 2.722 g/cm$^3$ and a sintered density of about 3.965 g/cm$^3$ while a green body composed of about 94% by weight of AlSI 316L stainless steel powder, 3% candellila wax and 3% stearic acid may have a green density of about 5.369 g/cm$^3$ and a sintered density of 7.890 g/cm$^3$.

Thus in order to maintain the body being processed in a state of buoyancy or weightlessness throughout the binder removal and sintering operations, the density of the fluid medium must be continuously adjusted to substantially match that of said body being processed.

Gases compressed at very high pressure are capable of attaining high densities matching those of green and sintered bodies. Thus if a body is placed in a compressed fluid medium the density of which matches its own density, it will be in a state of buoyancy. For example, Ishizaki et al., U.S. Pat. No. 5,516,481, teach the production of $B_2O_3$ glass spheres with density of 2.55 g/cm$^3$ in xenon gas at 400 MPa and at 600° C.

By controlling the density of the fluid medium it is thus possible to render the body substantially weightless and thus gravitational sag and shape distortion by frictional forces between the body and its support during shrinkage upon sintering will be averted. If, in addition to providing the necessary buoyancy, the compressed fluid medium is also a solvent for the organic binder of the green body, a method of binder removal in a state of buoyancy will have been created.

The necessary conditions for the application of the present invention will be realized by processing green bodies in a hot isostatic press (HIP) system capable of high pressures and temperatures. Such systems are commercially available, for example, from Messrs. Kobe Steel Ltd of Japan, (www.kobelco.co.jp), who offer ultrahigh pressure HIP units able to operate at 1 GPa and at 1,600° C. or at 980 MPa and 2000° C. while Messrs. Uhde High Pressure Technologies GmbH of Germany (www.uhde-hpt.com) produces HIP systems capable of pressure of up to 1.4 GPa.

The preferred fluid medium for the application of the present invention is a mixture of xenon and carbon dioxide. Xenon has the benefit of being substantially inert while its high molecular weight allows achieving high densities at relatively low pressures. Carbon dioxide, above its critical point, is a supercritical solvent for the organic binders used in the present invention. Thus by using a fluid medium that, during the dewaxing stage of the process is composed entirely of carbon dioxide or a mixture of carbon dioxide and xenon, the conditions for supercritical solvent extraction of the binder will be realized. Following binder extraction the supercritical solvent is no longer required and the densification stage of the process can be advantageously conducted in pure xenon. The precise volumetric ratio of xenon and carbon dioxide in the fluid medium can be optimized empirically depending on the density of the green body being processed in such a way that the necessary operating pressure can be minimized. For example, if a lightweight green body is to be processed, the fluid medium may contain a smaller proportion of xenon than when a green body of high density is to be processed.

The next step in the application of the present invention is the determination of the necessary pressure to subject the fluid medium to in order to make the green body buoyant at any instant of time during the binder extraction and sintering process. The necessary fluid medium pressure can be arrived at by theoretical or empirical methods.

In the application of the present invention, the simplest and preferred method of determining the necessary fluid medium operating pressure is the empirical method consisting of continuously monitoring the weight of the green body in real time throughout the binder extraction and densification process and to raise and maintain the fluid medium to the pressure at which the weight of the green body becomes substantially nil.

Continuous real time monitoring of the weight of the body being processed throughout the binder extraction and sintering process is readily accomplished using prior art techniques such as a high temperature resistant mechanical balance equipped with an inductive type linear displacement transducer, the output signal of which can be easily made to traverse the wall of the HIP vessel to external display electronics. Other methods of real time monitoring of the weight of the green body being processed may of course be used.

Thus, in the application of the present invention, the green body is placed on the pan of the high temperature resistant balance, the latter having been positioned in the tank of the HIP system and connected through the wall of the pressure vessel to the external display electronics. Upon sealing the pressure vessel the latter is evacuated and the fluid medium introduced. The pressure of the fluid medium is then raised by virtue of which its density will increase. The weight of the green body is observed to drop and, when the density of the fluid medium equals that of the green body, will be substantially nil, indicating the state of buoyancy or weightlessness. The system is now allowed to go through the appropriate temperature versus time profile which will have been determined empirically based on each different type of green body geometry and composition. Throughout the binder removal and sintering process the pressure inside the HIP vessel is used as a process control parameter to ensure buoyancy of the body being processed.

As indicated earlier, the composition of the fluid medium can be changed at any time during the binder removal and sintering process. For example, if a fluid medium composed of xenon and carbon dioxide is used during the binder removal portion of the process, the rest of the process, i.e. the sintering or densification step, may be advantageously conducted in pure xenon as this will allow to continue the process at a lower pressure than if the initial composition of the fluid medium were maintained.

The theoretical method of determining the necessary fluid medium operating pressure makes use of the virial expansion, also called the virial equation of state for non-ideal gases:

$$\frac{PV}{nRT} = \frac{PM}{\rho RT} = Z = 1 + B\frac{n}{V} + C\frac{n^2}{V^2} + \ldots \quad (2)$$

where P is the pressure, V is the volume, n is the number of moles, R is the universal gas constant, T is the temperature, M is the molar mass, ρ is the density, Z is the compressibility factor, B is the second virial coefficient, C is the third virial coefficient, etc.

An alternate form of the virial expansion is an infinite series in powers of the pressure rather than volume, thus:

$$\frac{PV}{nRT} = \frac{PM}{\rho RT} = Z = 1 + B'P + C'P^2 + \ldots \quad (3)$$

where B' and C' are now the second and third virial coefficients of the virial expansion in terms of pressure. There appears to be no accepted special nomenclature to discriminate between B and B' or C and C' but the two types are related by following equations:

$$B' = \frac{B}{RT} \quad (4)$$

$$C' = \frac{C - B^2}{R^2 T^2} \quad (5)$$

For the more common conditions of temperature and pressure, the gas compressibility factor Z can be obtained directly from tabulations in technical handbooks such as, for example, the *Gase-Handbuch* edited by Messer Griesheim GmbH, cited in the references. When Z values cannot be found in handbook tabulations directly, they can be calculated by means of the virial expansion (3), usually truncated after the term containing the second virial coefficient, thus:

$$\frac{PM}{\rho RT} = Z = 1 + B'P = 1 + \frac{BP}{RT} \quad (6)$$

The second virial coefficient B can be found in technical handbooks such as the *CRC Handbook of Chemistry and Physics*, cited in the references, for a number of selected gases and over a wide temperature range. For the less common conditions of high temperature and pressure, such as those required in the application of this invention, neither values for Z nor for the second virial coefficient will be easily found in handbook tabulations. In such cases, the second and third virial coefficients may be approximated with the help of the van der Waals constants a and b from the well-known van der Waals equation of state $$\left(P + \frac{an^2}{V^2}\right)(V - nb) = nRT \quad (7)$$

The van der Waals constants are calculated from the critical temperature and pressure, $T_C$ and $P_C$, using following equations:

$$a = \frac{27R^2 T_C^2}{64 P_C} \quad (8)$$

$$b = \frac{RT_C}{8 P_C} \quad (9)$$

The second and third virial coefficients are then obtained using following formulae:

$$B = b - \frac{a}{RT} \quad (10)$$

$$C = b^2 \quad (11)$$

The pressure to which the fluid medium must be subjected in order to achieve a specific density can be derived from equation (6), thus:

$$P = \left(\frac{M}{\rho RT} - B'\right)^{-1} = RT\left(\frac{M}{\rho} - B\right)^{-1} \quad (12)$$

For the lower pressure and temperature range, equation (12) can be used to determine the required pressure-temperature-time profile. At higher temperatures and pressures the theoretical method of determining the necessary operating pressure of the fluid medium based on the use of equations of state is not accurate and the empirical method outlined earlier is preferred.

As an illustration of the use of the theoretical method to determine the necessary pressure of the fluid medium, if an alumina green body with a green density of 2.722 g/cm³ is to be processed, a fluid medium of composition Xe: 50%-$CO_2$ 50% may be used. From the *CRC Handbook* and using equations (8) and (9), following data for xenon and carbon dioxide are obtained:

|  | Xe | $CO_2$ |
| --- | --- | --- |
| Molar mass, kg/mol | 0.131293 | 0.0440098 |
| Critical Temperature, $T_C$, (K) | 289.77 | 304.13 |
| Critical Pressure, $P_C$, (Pa) | 5.841 $10^6$ | 7.375 $10^6$ |
| van der Waals constant a | 0.4192535469 | 0.365774655 |
| van der Waals constant b | 5.155999749 $10^{-5}$ | 4.285918519 $10^{-5}$ |
| $2^{nd}$ virial coefficient B, $m^3$/mol @ 300K | $-1.29\ 10^{-4}$ | $-1.26\ 10^{-4}$ |

The molar mass, van der Waals constants and second virial coefficient at 300K for the selected fluid medium are thus:

M, kg/mol=(0.131293*0.5)+(0.0440098*0.5)=0.0876514

B, $m^3$/mol@300K=(−1.29 $10^{-4}$*0.5)+(−1.26 $10^{-4}$*0.5)=−1.275 $10^{-4}$ a=(0.4192535469*0.5)+(0.365774655*0.5)=0.392514101 b=(5.155999749 $10^{-5}$*0.5)+(4.285918519 $10^{-5}$*0.5)=4.720959134 $10^{-5}$

Equation (12) yields the required pressure of the fluid medium:

P, Pa=8.31451*300*((0.0876514/2.722 $10^3$)−(−1.275 $10^{-4}$))$^{-1}$≈15,618,884 Pa≈15.6 MPa

At the outset of the binder removal and sintering process, pressurizing the HIP vessel to 15.6 MPa will render the green body buoyant in the fluid medium.

Upon reaching the temperature of 700K, the organic binder will have been extracted and the original green body will have become an alumina compact with an open porosity structure. Thus its density will be substantially that of sintered alumina, i.e. 3.965 $10^3$ kg/$m^3$. The value of the second virial coefficient at 700K for xenon cannot be found in the *CRC Handbook*. The second virial coefficient for the fluid medium is thus obtained using equation (10), as follows:

B, $m^3$/mol@700K=4.720959134 $10^{-5}$−(0.392514101/(8.31451*700))=−2.023087478 $10^{-5}$ Equation (12) again yields the required pressure of the fluid medium:

P, Pa=8.31451*700*((0.0876514/3.965 $10^3$)−(−2.023087478 $10^{-5}$))$^{-1}$≈137,471,614 Pa≈137.5 MPa

At this point in the process the composition of the fluid medium can be changed to 100% xenon since the carbon dioxide is no longer required. If the temperature is maintained at 700K during the changeover, the pressure of the fluid medium must be adjusted to maintain buoyancy in pure xenon. The second virial coefficient for pure xenon at 700K is obtained using equation (10), as follows:

B, $m^3$/mol@700K=5.155999749 $10^{-5}$−(0.4192535469/(8.31451*700))=−2.047475121 $10^{-5}$ Equation (12) again yields the required pressure of the pure xenon:

P, Pa=8.31451*700*((0.0876514/3.965 $10^3$)−(−2.047475121 $10^{-5}$))$^{-1}$≈136,684,226 Pa≈136.6 MPa

The process is then continued until densification is substantially completed while constantly adjusting the pressure of the pure xenon to maintain the body being sintered in a state of buoyancy.

CONCLUSION, RAMIFICATIONS AND SCOPE

The application of the present invention is far reaching and of benefit to a great number of applications presently not feasible due to the problems of gravitational sag and shape distortion resulting from friction of the green body over its support processing. Such applications include large sized parts with convoluted geometries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A method of binder extraction and sintering of a green body in a state of weightlessness, comprising:
   a. providing a green body composed of at least one sinterable particulate material and an organic binder soluble in supercritical fluids,
   b. placing said green body on a weighing device capable of operating in the environment of a hot isostatic press system and displaying the weight of said green body externally to said hot isostatic press system,
   c. loading said weighing device and said green body into the chamber of said hot isostatic press and filling said chamber with a fluid medium which, above its critical point, is a solvent for the organic binder of said green body,
   d. pressurizing said fluid medium until said external green body weight indication is substantially nil,
   e. raising the temperature in the chamber of said hot isostatic press system until binder extraction and sintering of the green body are substantially completed whilst maintaining said fluid medium at a pressure such that said green body weight indication remains substantially nil.

2. The method of claim 1 wherein said fluid medium is constituted by a plurality of supercritical fluids.

3. The method of claim 1 wherein said fluid medium is carbon dioxide.

4. The method of claim 1 wherein said fluid medium is xenon.

5. The method of claim 1 wherein said fluid medium is constituted by a mixture of carbon dioxide and xenon.

6. The method of claim 1 wherein the composition of said fluid medium is changed during binder removal and sintering of said green body.

7. The method of claim 1 wherein said green body has a convoluted geometry.

8. A method of binder extraction and sintering of a green body in a state of weightlessness, comprising:
   a. providing a green body composed of at least one sinterable particulate material and an organic binder soluble in supercritical fluids,
   b. loading said green body in the chamber of a hot isostatic press system and filling said chamber with a fluid medium which, above its critical point, is a solvent for the organic binder of said green body,
   c. raising the temperature in the chamber of said hot isostatic press system until binder extraction and sintering of the green body are substantially completed whilst maintaining said fluid medium at such pressure, as determined by a suitable mathematical model, to result in its density remaining substantially equal to that of said green body.

9. The method of claim 8 wherein said fluid medium is constituted by a plurality of supercritical fluids.

10. The method of claim 8 wherein said fluid medium is carbon dioxide.

11. The method of claim 8 wherein said fluid medium is xenon.

12. The method of claim 8 wherein said fluid medium is constituted by a mixture of carbon dioxide and xenon.

13. The method of claim 8 wherein the composition of said fluid medium is changed during binder removal and sintering of said green body.

14. The method of claim 8 wherein said green body has a convoluted geometry.

* * * * *